(12) United States Patent  (10) Patent No.: US 8,292,609 B2
Guinard et al.  (45) Date of Patent: Oct. 23, 2012

(54) MACHINE FOR SHAPING DOUGH PIECES

(75) Inventors: Jean-Yves Guinard, Meung sur Loire (FR); Denis Regnier, Meung sur Loire (FR); Yves Gerber, Holtzheim (FR); Andre Bezet, Sancergues (FR)

(73) Assignee: Bongard, Holtzheim (FR)

( * ) Notice: Subject to any disclaimer, the term of this patent is extended or adjusted under 35 U.S.C. 154(b) by 682 days.

(21) Appl. No.: 11/919,216

(22) PCT Filed: Apr. 25, 2006

(86) PCT No.: PCT/FR2006/000921
§ 371 (c)(1),
(2), (4) Date: Oct. 25, 2007

(87) PCT Pub. No.: WO2006/114518
PCT Pub. Date: Nov. 2, 2006

(65) Prior Publication Data
US 2008/0193618 A1 Aug. 14, 2008

(51) Int. Cl.
*A21C 5/00* (2006.01)

(52) U.S. Cl. ........ 425/238; 425/235; 425/298; 425/299; 425/300; 425/310; 426/518

(58) Field of Classification Search .......... 425/94, 425/95, 106, 235, 238, 289, 298, 300, 306, 425/307, 310, 311, 316, 412, 423, 292, 295; 426/297, 302, 305, 502, 518
See application file for complete search history.

(56) References Cited

U.S. PATENT DOCUMENTS

| 1,765,285 | A | | 6/1930 | Robinson | |
|---|---|---|---|---|---|
| 1,847,150 | A | | 3/1932 | Ward et al. | |
| 3,324,809 | A | | 6/1967 | Rhodes | |
| 3,363,589 | A | | 1/1968 | Addington | |
| 4,055,892 | A | * | 11/1977 | Del Vecchio | 30/303 |
| 4,615,671 | A | * | 10/1986 | Bernal | 425/289 |
| 5,848,470 | A | * | 12/1998 | Anderson | 30/277 |
| 6,276,918 | B1 | * | 8/2001 | Slaughter et al. | 425/289 |
| 7,480,999 | B2 | * | 1/2009 | Atwater et al. | 30/289 |
| 2004/0013770 | A1 | | 1/2004 | Evans et al. | |

FOREIGN PATENT DOCUMENTS

| DE | 62 273 C | 6/1892 |
|---|---|---|
| DE | 36 08 331 C1 | 7/1987 |
| DE | 3 911 782 A1 | 10/1990 |
| DE | 195 29 281 A1 | 2/1997 |
| FR | 935 714 A | 6/1948 |

(Continued)

*Primary Examiner* — Joseph Del Sole
*Assistant Examiner* — Seyed Masoud Malekzadeh
(74) *Attorney, Agent, or Firm* — Oliff & Berridge, PLC

(57) ABSTRACT

A machine for shaping dough pieces from a batch of risen dough placed in a holding pan includes a set of tools that can move between a number of positions for activating different tools for sequentially applying them to the dough, the pan and the set of tools being placed in a relative motion whereby respectively approaching or moving away from one another. The set of tools includes a tool for controlled spreading of the dough inside the pan for rendering its thickness uniform while essentially preserving its initial volume; a tool for shaping/dividing the dough into distinct dough pieces, equipped with partition walls that, between them, define receptacles for the shaping of dough pieces the shape of these partition walls in each receptacle being provided for progressively drawing an upper surface layer of the dough and pushing back the remainder of the dough into said layer.

15 Claims, 5 Drawing Sheets

FOREIGN PATENT DOCUMENTS

| | | |
|---|---|---|
| FR | 1 312 602 A | 12/1962 |
| FR | 1 320 045 A | 3/1963 |
| FR | 2 516 749 A | 5/1983 |
| FR | 2 838 296 A1 | 10/2003 |

* cited by examiner

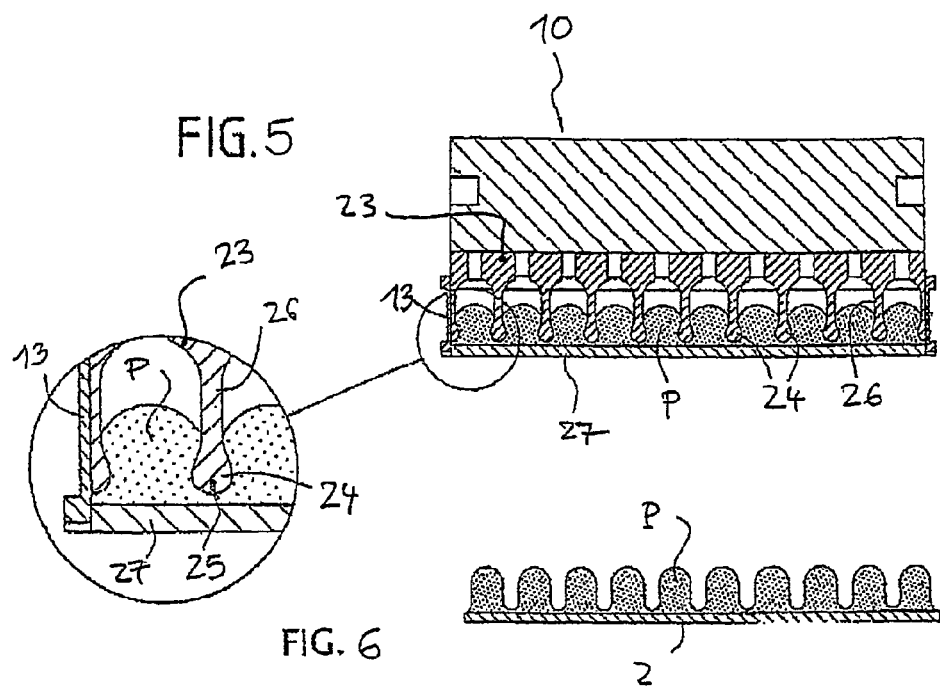
FIG. 5
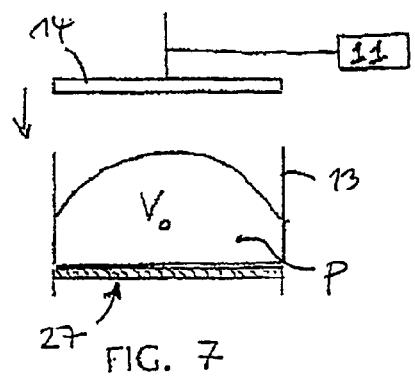
FIG. 6
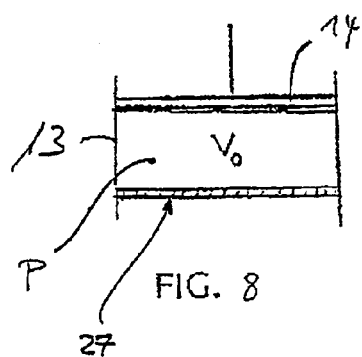
FIG. 7
FIG. 8

MACHINE FOR SHAPING DOUGH PIECES

The present invention relates to a machine for forming dough pieces from a mass of leavened dough in order to make baguette loaves for example.

At the present time, when making baguettes, a baker begins by placing his dough in a bin before transferring it to a divider which cuts it into pieces of substantially equal volume. These dough pieces or balls are then placed in the pans of a dough rester.

The requirement of allowing the dough pieces to rest at this stage derives from the degassing the dough undergoes when it is divided into pieces, preceded by a phase in which the dough volume is compressed. The purpose of the resting time is to at least partially restore the internal puffy texture of the dough, which is required for making bread.

The rested dough pieces are then shaped in a shaper conferring thereon a long oblong shape close to the final shape of the baguettes. When they leave the shaper, which also subjects them to a mechanical treatment that may change their volume and hence their puffy structure, the oblong dough pieces once again rest for several hours in a fermentation chamber before being placed in the oven to bake.

All these operations take a great deal of time, particularly because many of them are manual operations. The very nature of some of the steps and the mechanical constraints they involve require them to be followed by a dough resting period, which thus prolongs the total baguette-making time.

The goal of the present invention is to remedy the drawbacks of the prior art by providing a machine for forming dough pieces from a block of leavened dough, for example for making baguettes, so that, when they leave said machine, the dough pieces can be placed directly in the oven for final baking.

It is no longer necessary to shape, or shape into balls, or allow intermediate rest periods, so that the time elapsed from dough-making to placement in the oven is considerably shortened.

For this purpose, the dough-making machine according to the invention classically has a tray for receiving a mass of leavened dough, and a set of tools that can move between several positions for activation of the various tools in order to apply them sequentially to the dough, whereby the tray and the set of tools have a relative movement that brings them together or moves them apart.

It is mainly characterized in that the set of tools includes:
controlled spreading means of the dough in the tray to create a uniform thickness while substantially preserving its initial volume;
means for shaping/individualizing the dough into distinct pieces, provided with separating partitions which, between them, define chambers for forming the dough pieces when the tool block moves toward the tray, thus bringing the partitions to the bottom of the tray, the shape of said separating partitions in each chamber being designed to gradually stretch out an upper surface layer of the dough and push the remainder of the dough back inside said surface layer which closes up as the partitions approach the bottom of the tray; full individualization of the dough pieces is effected when the separating partitions contact the bottom of the tray.

The machine according to the invention proceeds from an entirely different logic than the logic on which customary breadmaking processes are based. Essentially, there is no longer a dough division step as exists by cutting in classical dividers after kneading of the dough.

The degassing that results from such kneading at least partially destroys the cellular texture of the dough, and some of the remaining cells are eliminated during the division into pieces. Yet it is the existence and quality of the cellular texture that is highly desirable in breadmaking.

A loaf from a properly cellular dough has a better taste and a far more pleasant appearance and texture; it also keeps better over time, whether under dry or humid conditions. Thus, when the atmosphere is dry, this type of bread becomes stale far more slowly. Conversely, the moisture in ambient air with a high degree of humidity is better absorbed and leads to a less-spongy texture of a loaf in such air.

In fact, the loaves thus produced resemble traditional loaves made by artisanal bakers; hence preservation of the cells in the dough is fundamentally desirable.

In terms of productivity, the machine according to the invention is of undeniable advantage in that it reduces the number of tasks to be performed by the baker by about 40%. Specifically, by comparison to the time spent baking a baguette, the reduction in time is approximately 25%. Moreover, this machine economizes on the surface area occupied in the oven, as well as on labor whose cost is a particularly large factor in the final price of the bread.

According to one possible configuration, the controlled dough-spreading means consists of a flat pressure plate designed to apply uniform pressure to the dough disposed in the tray, associated with means for detecting a counter-pressure applied to the pressure plate when it moves relatively to the tray, whereby the counter-pressure detection means causes the movement to stop when a predetermined counter-pressure threshold is reached.

In practice, when a counter-pressure appears, the movement of the pressure plate or the tray is stopped before the dough is compacted and undergoes degassing caused by the compression, bringing about a reduction in volume.

As already mentioned above, it has been noticed that if one takes care not to increase the total volume of dough initially deposited in the tray, and confines oneself simply to uniformizing the dough without compacting it, time savings in the resting phases may be effected. When this operation of compacting the dough in the tray is omitted, there is practically no expulsion of gas, particularly the carbon dioxide contained in the dough and formed by the leavening effect. This is why it is no longer necessary to allow the dough pieces to rest, as the purpose of resting is to allow the yeast to form more carbon dioxide with a view to baking.

Preferably, the relative tray/plate movement is achieved by an electric motor, whereby the detection means consists of measuring the torque of the electric motor, and the movement stops when the motor torque increases.

It should be noted that the two principle means of the invention, namely the means for effecting controlled spreading and the means for shaping/individualization without cutting (hence within damaging the cells in the dough) have, in the end, the same goal: to preserve the cellular texture and hence to keep the gas inside the volume during the various processing steps.

According to one option inherent in the invention, the shaping/individualization means consist of parallel separating partitions extending from one plate and regularly spaced, whose end portion forms a bead with a droplet-shaped cross section.

Such a separating partition shape enables dough pieces that directly have the shape of a baguette loaf to be obtained, which can consequently be sent to the oven without shaping or resting times as their structural integrity has been respected.

More specifically, the parallel separating partitions have a parallelepipedic base connected by concave rounded surfaces to a central wall that is thinner than the base and ends in a bead with a droplet-shaped cross section. The two facing surfaces of two adjacent partitions then delimit a chamber in the oblong shape of a dough piece from which a baguette is to be produced.

The free end of the bead with a droplet-shaped cross section can then be provided with a cutting edge for separating the dough pieces. More specifically, said cutting edge can be a blade integral with the free end of said bead.

This blade, which in fact completes the separation of the dough pieces by contacting the bottom of the tray, intervenes when the shaping operation is practically terminated, and has no influence on the cells in the dough because it acts in a thin connecting portion between two adjacent dough pieces in the final preshaping phase, in practice outside the nearly-closed surface layer, delimiting the dough pieces.

Preferably, the controlled dough spreading means and the dough piece forming/individualization means are located on two sides of the same tool block. Said tool block is for example rotationally mobile above the dough receiving tray.

It is then possible to proceed sequentially with controlled spreading of the dough, in the first phase, and then with shaping/individualization of the dough pieces.

Preferably, it is the receiving tray that is designed to be translationally movable between a first position at a distance from the tool set and a second position of interaction therewith.

The machine according to the invention, between two interaction steps, then causes rotation of the tool block in order to bring the face provided with the tools of the next step into a position opposite the tray. The tray is then raised in contact with the selected tool plate, and the operation corresponding to the step to be implemented takes place.

According to an additional option, the bottom of the tray is removable. This feature is advantageous in that a table supporting the dough pieces can easily be removed from the machine according to the invention in order to easily place the dough pieces on the oven conveyors with a view to placing them in the oven where they are baked.

The machine according to the invention preferably has a guard with a window providing access to the dough receiving tray, said window being closable by a flap.

To prevent any risk of accidents, the user cannot access the inside of the machine while it is operating. The safety measures are reinforced by the fact that the flap cooperates with a safety electrical contact whose closed position corresponds to the position in which window is closed by the flap, which allows activation of the means that drive the tool set and allow the relative movement between the tray and the tool set.

Thus, the spreading of the dough and its separation into individual pieces can be effected only if the flap is closed, which prevents any untimely intervention by the user during the operation.

The invention also relates to a method for making dough pieces in order to bake them in an oven to obtain bread.

This method, implemented with a machine as described above, is mainly characterized by including the following steps:

positioning the tool set so that the means for spreading a mass of leavened dough disposed in the receiving tray are in a position above and facing the tray;

application of a controlled pressure to the dough mass by relative movement between the tray and the tool set in order to bring them together so as to spread it by uniformizing its thickness while keeping its volume substantially constant;

reverse movement in order to separate the set of tools from the tray;

actuation of the movement of the tool set so that the shaping and individualization means are brought into a position above and facing the tray;

relative movement of the tool set and tray so that the dough piece forming and individualization means can be applied to the pre-spread dough;

reverse movement in order to separate the tool set from the tray.

In fact the application of pressure is effected, as mentioned above, by monitoring the existence of a counter-pressure exerted by the dough, and stopping the controlled spreading means as soon as a counter-pressure is detected.

More specifically, as referred to in the context of the machine, the method of the invention employs a tray driven by an electric motor toward a pressure plate, said motor stopping as soon as an increase in motor torque is detected.

It should be emphasized that, in addition to the aforesaid financial advantages of the machine according to the invention, health and hygiene issues have also been taken into account in its design. The machine is designed to be impermeable to flour dust. Since, in a bakery, it replaces a number of manual operations and various machines requiring transfers to the open air and opening and closing machinery movements, flour emissions in the bakery are about 10% of the emissions found in a traditional bakery. Hence there is an approximately 90% reduction in flour suspended in the bakery air, which is considerable.

Forty percent of occupational diseases among bakers come from flour allergies, such as specific forms of asthma, etc. The machine and method of the invention are hence particularly advantageous from the health standpoint.

The invention will now be described in greater detail, with reference to the attached drawings, wherein:

FIG. 5 shows, in cross section, the means for shaping and individualizing the dough pieces, with an enlargement thereof;

FIG. 6 shows, in cross section, the bottom of the receiving tray with the individualized dough pieces; and FIGS. 7 and 8 show schematically the action of the controlled dough spreading means.

Figure 1:
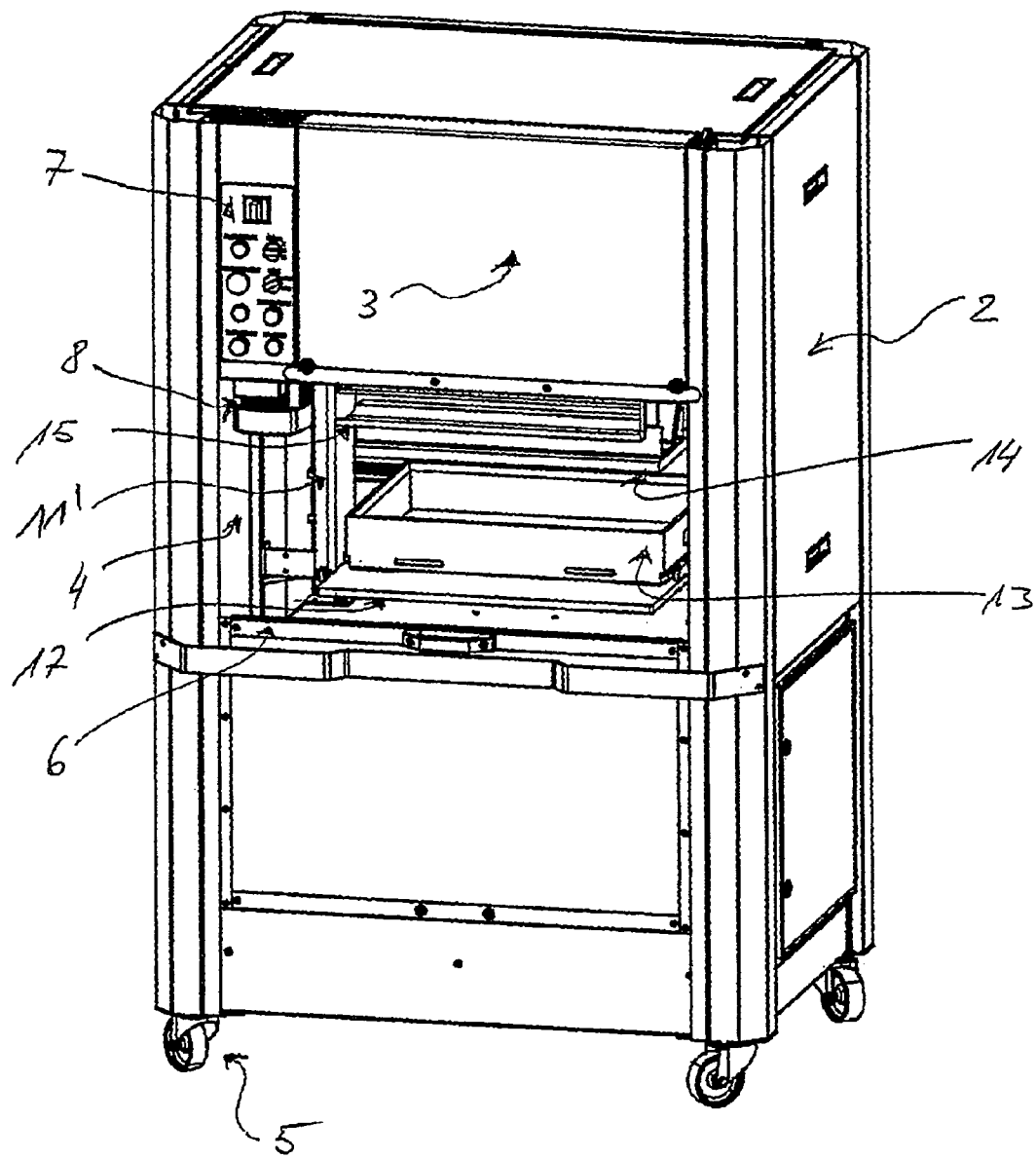
FIG. 1 is a perspective view of the machine.
Figure 2:
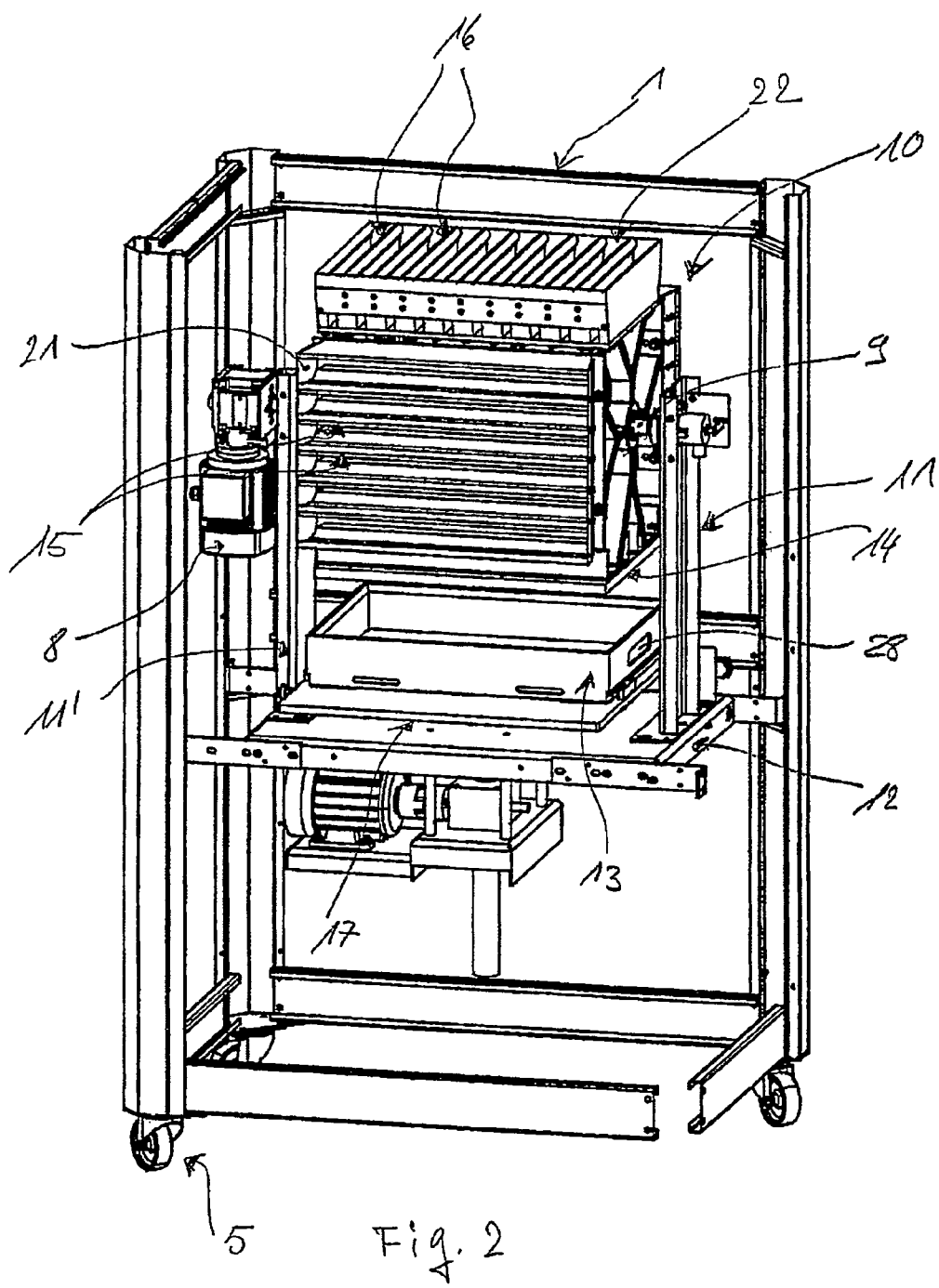
FIG. 2 shows, in an enlarged perspective, a view of the machine frame without the protective guard.

The machine shown in the drawings consists of a frame (1) supported on rollers (5), the whole of which is hidden by a guard (2). A facade wall (3) is provided with a window (4) that can be closed by a movable flap (6). In the vicinity of said window (4) is a control panel (7). The frame (1) supports a first motor (8) (see FIG. 2) driving, via a reduction gear, a shaft (9) supporting a tool block (10). The rotating shaft (9) is free to rotate on two risers (11, 11') attached to a platform (12) integral with the frame (1).

On its visible sides, the tool block (10) has tools with different functions. Thus, at the lower part, and positioned opposite the dough-receiving tray (13), a pressure plate (14) is provided for controlled spreading of the dough located in said tray (13).

On the other two visible sides of the tool block (10), shaping and individualization partitions, one longitudinal (15) and one transversal (16), form the dough pieces, in this case to form baguette loaves of two different lengths.

Figure 3:
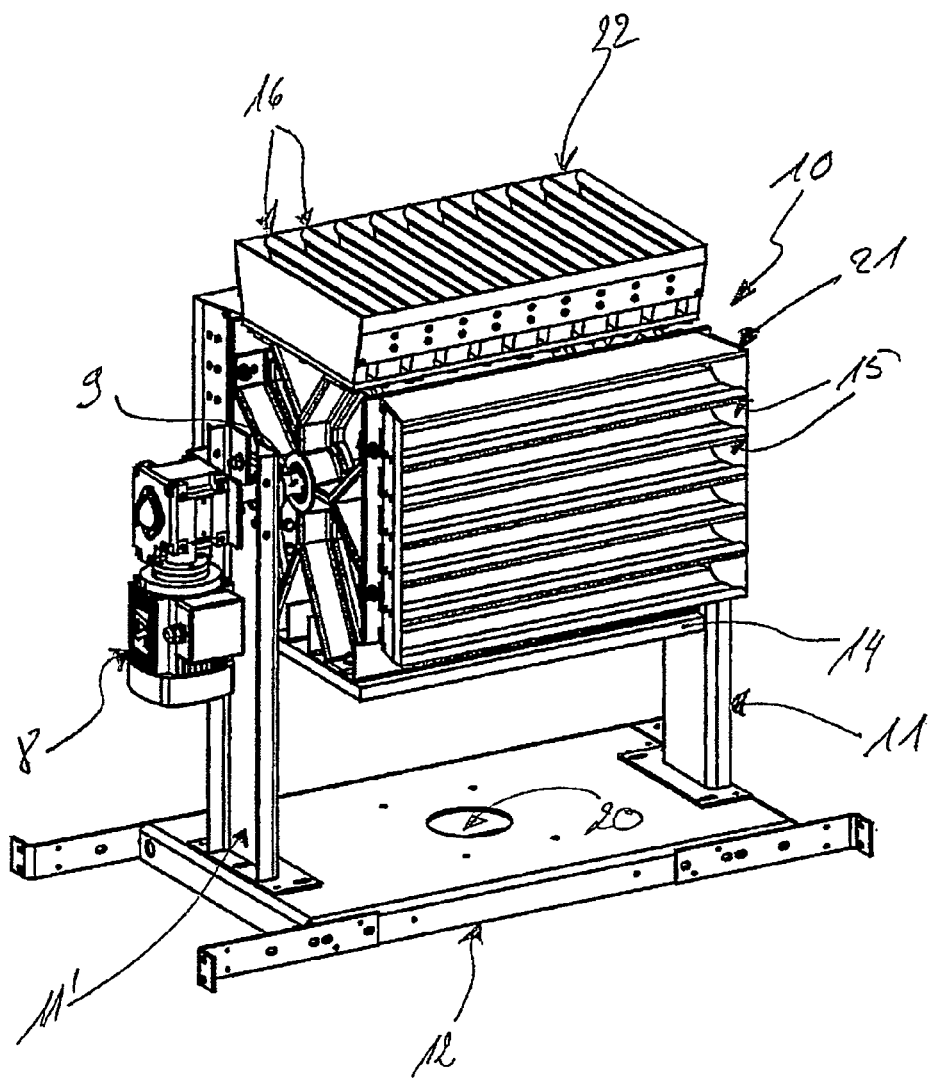
FIG. 3 is a perspective view of the tool block attached to a portion of the frame.

Each elongate and oblong dough piece is made between two adjacent partitions (15, 16) on the same side. The tool block (10) is shown in greater detail in FIG. 3.

When the dough has been spread in controlled fashion by the pressure plate (14), the tool block (10) pivots 90° or 180° in order to present a shaping/individualization face opposite the dough located in tray (13).

Figure 4:
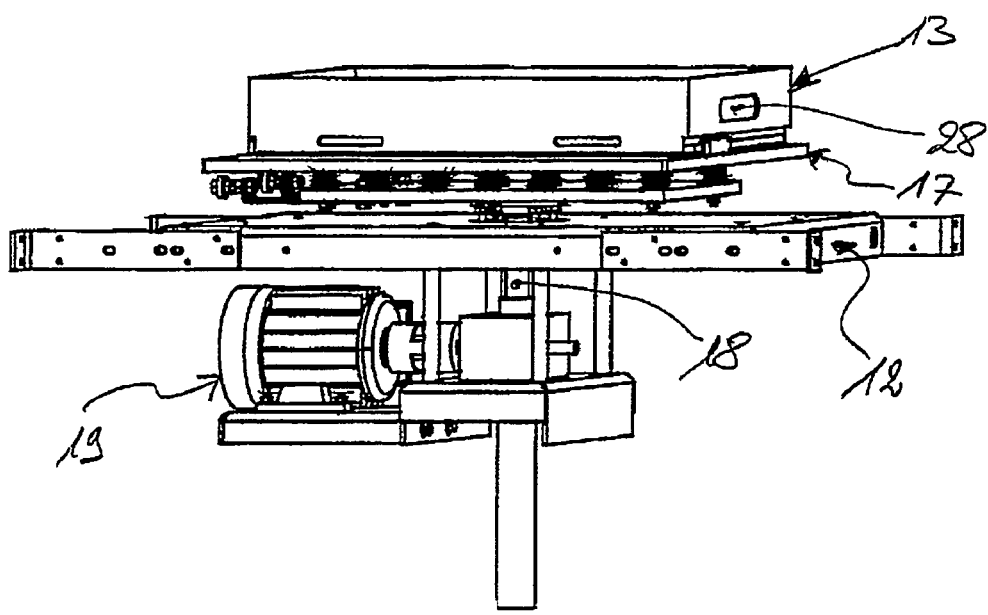
FIG. 4 is a perspective view of the dough receiving tray and its drive means.

Tray (13) is placed on a table (17) (see FIG. 4) moved translationally by a shaft (18) driven by motor (19). Support shaft (18) passes through an orifice (20) provided in platform (12). After tool block (10) has rotated so that the selected face is above and facing tray (13), the latter is driven upward by motor (19) until an interaction takes place between the tools and the dough.

The free ends of the separating partitions (15, 16) must come in contact with the bottom of tray (13), while the peripheral supports (21, 22) delimiting said partitions (15, 16) are dimensioned such that they can be inserted into said tray (13), thus guiding the tool during the interaction.

The operation of both types of tools (14; 15, 16) appears particularly clearly in FIGS. 5 to 8. Thus, it is the transverse shaping/individualization tool appearing at the top of tool block (10) in FIGS. 2 and 3 that appears in FIG. 5.

When the dough (P) deposited in tray (13) is acted upon by pressure plate (14), as shown in FIGS. 7 and 8, it becomes distributed inside this tray (13) while substantially retaining its volume $V_0$. When it is spread, the tray (13) is driven downward by motor (19) so as to displace the tool block (10). The latter then pivots through 180° under the action of motor (8) so that separating partitions (16) disposed in support (22) are brought to face tray (13). Said separating partitions (16) are shown enlarged: they have a parallelepipedic base (23) and an end bead (24) with a droplet-shaped cross section inside which is attached a blade (25). The base (23) and the end bead (24) are connected by a thinner part (26).

Tray (13) rises gradually against separating partitions (16) until the end blade (25) comes in contact with removable bottom (27) of tray (13). In this case, the particular shape conferred on the partitions brings about shaping and quasi-individualization of the dough pieces as shown in FIG. 6. These pieces are then fully individualized when blade (25) comes in contact with bottom (27).

When the dough pieces are formed, the tray (13) is once more driven translationally downward by motor (19). It can then be extracted from the machine, after the flap (6) has been opened using side knobs (28) that appear in particular in FIG. 4. The receiving tray (13) is then for example placed on a table provided with means for disconnecting the bottom (27) from the peripheral support of tray (13). Said bottom (27) could then be separated from the table to make handling of the elongate dough pieces as easy as possible with a view to positioning them on the oven conveyor. These pieces are then placed in the oven after being shaped with the blade.

As stated above, in order for the operation of the pressure plate (14) to take place correctly, a torque detector is provided which monitors the torque value of motor (19). When the tray rises (13), the torque value is low (except at startup, which can require a certain torque). When the pressure plate (14) arrives in contact with dough (P), the latter deforms to become uniform. At the beginning of this deformation, the dough (P) applies no counter-pressure to the plate (14). Under the action of the plate (14) pressure, the dough has a tendency to move and spread, and not resist the movement of plate (14). Hence there is no substantial reaction force on the plate (14). Once the dough is flattened and uniformized, as shown in FIG. 8, the dough (P) on the contrary tends to compress as tray (13) continues to rise. A counter-pressure then appears, detected by an increase in the torque of motor (19). The control system of motor (19) then cuts off the movement of the tray (13), which stops the relative movement between plate (14) and tray (13).

The closed volume delimited by tray (13) and plate (14) is thus in practice substantially equal to the volume $V_0$ of dough (P) initially disposed in tray (13). The dough is not compressed and has therefore not lost the carbon dioxide formed by the yeast during the leavening period.

When tray (13) stops, the motor (19) is automatically commanded to move plate (17) in the reverse direction to the waiting position, the position in which the motor is commanded, where applicable, so that the tool block (10) is pivoted, in this case through 180°, so that the shaping/individualization walls (16) are turned opposite dough (P).

There is no further degassing after the intervention of separating partitions (15, 16). The oblong dough pieces produced, which already have practically the shape of baguettes, can thus be placed in the oven immediately, with no need to let them rest.

As indicated, all the movements can be commanded only when the flap (6) is closed, and the command button on the control panel (7) is pressed.

Flap (6) actuates for example an end-of-travel contact (not shown), closing of which allows the assembly to operate, namely in actual fact enabling the command buttons to be activated, while opening this end-of-travel contact means that the flap (6) is not closed, and that operation of the machine is not permitted.

The invention is not, of course, confined to the embodiment described and illustrated above. Numerous modifications of detail may be made thereto without thereby departing from the framework of the invention.

The invention claimed is:

1. Machine for forming dough pieces from a mass of leavened dough placed in a receiving tray, having a tool set that can move between several positions to activate various tools and apply the various tools sequentially to the dough, whereby the tray and tool set have a relative movement that either brings them closer or moves them apart, the tool set comprising:
controlled means for spreading the dough in the tray in order to make a thickness of the dough uniform while substantially preserving an original volume of the dough; and
means for shaping and individualizing dough into distinct, pieces comprising parallel separating partitions extending from one plate, an end of each of the separating partitions each comprising a bead with a droplet-shaped cross section, and defining regularly spaced chambers between the separating partitions for shaping the dough pieces when the tool set and the tray move relatively toward each other so that the partitions are carried to a bottom of the tray, wherein the bead of each of the separating partitions in each chamber is designed to gradually stretch out an upper surface layer of the dough and push the remainder of the dough back inside the surface layer which closes up as the partitions approach the bottom of the tray;
wherein full individualization of the dough pieces is effected when the separating partitions contact the bottom of the tray.

2. Machine for forming dough pieces according to claim 1, wherein the controlled dough-spreading means comprises a flat pressure plate designed to apply uniform pressure to the dough disposed in the tray, associated with means for detecting a counter-pressure applied to the pressure plate when the pressure plate moves relatively to the tray, whereby the counter-pressure detection means cause the movement to stop when a predetermined counter-pressure threshold is reached.

3. Machine for forming dough pieces according to claim 2, wherein the relative tray/plate movement is achieved by means of an electric motor, the detection means measuring a torque of the electric motor, and the movement stopping when the torque increases.

4. Machine for forming dough pieces according to claim 1, wherein the parallel separating partitions have a parallelepipedic base connected by concave rounded surfaces to a central wall that is thinner than a base of the wall and ends in the bead with the droplet-shaped cross section.

5. Machine for forming dough pieces according to claim 4, wherein a free end of the bead with the droplet-shaped cross section is provided with a cutting edge for separating the dough pieces.

6. Machine for forming dough pieces according to claim 5, wherein the cutting edge is provided by a blade integral with a free end of the bead with the droplet-shaped cross section.

7. Machine for forming dough pieces according to claim 1, wherein the controlled dough spreading means and the dough shaping and individualization means are located on two sides of the tool set.

8. Machine for forming dough pieces according to claim 7, wherein the tool block is rotationally movable above the dough receiving tray.

9. Machine for forming dough pieces according to claim 1, wherein the tray is translationally movable between a first position at a distance from the tool set and a second position for interaction therewith.

10. Machine for forming dough pieces according to claim 1, wherein the bottom of the tray is removable.

11. Machine for forming dough pieces according to claim 1, including a guard provided with a window that gives access to the dough and the tray, the window being closable by a flap.

12. Machine for forming dough pieces according to claim 11, wherein the flap cooperates with a safety electrical contact whose closed position corresponds to a position in which the window is closed by the flap, which allows activation of a means that drives the tool set and allows the relative movement between the tray and tool set.

13. Method for making dough pieces in order to bake them in an oven for obtaining bread, with the aid of a machine according to claim 12, including the following steps:
   positioning the tool set so that the means for spreading the dough, which is a leavened mass, disposed in the tray is in a position above and facing the tray;
   application of a controlled pressure to the dough by relative movement between the tray and the tool set in order to bring the tray and the tool set together so as to spread the dough by uniformizing the thickness of the dough while keeping the original volume substantially constant;
   reverse movement in order to separate the tool set from the tray;
   actuation of the movement of the tool set so that the shaping and individualization means are brought into a position above and facing the tray;
   relative movement of the tool set and the tray so that the shaping and individualization means can be applied to the dough, which has been spread;
   reverse movement in order to separate the tool set from the tray.

14. Method for making dough pieces according to claim 13, wherein the application of the controlled pressure is effected by monitoring the existence of a counter-pressure exerted by the dough and by stopping the controlled spreading means as soon as a counter-pressure is detected.

15. Method for making dough pieces according to claim 14, wherein the tray is driven by an electric motor toward a pressure plate, the motor stopping as soon as an increase in motor torque is detected.

* * * * *